(12) United States Patent
Zhang et al.

(10) Patent No.: US 11,531,242 B2
(45) Date of Patent: Dec. 20, 2022

(54) LIQUID CRYSTAL DISPLAY PANEL

(71) Applicant: Shenzhen China Star Optoelectronics Semiconductor Display Technology Co., Ltd., Guangdong (CN)

(72) Inventors: Qi Zhang, Guangdong (CN); Wu Cao, Guangdong (CN)

(73) Assignee: Shenzhen China Star Optoelectronics Semiconductor Display Technology Co., Ltd., Guangdong (CN)

( * ) Notice: Subject to any disclaimer, the term of this patent is extended or adjusted under 35 U.S.C. 154(b) by 204 days.

(21) Appl. No.: 16/766,591

(22) PCT Filed: Apr. 15, 2020

(86) PCT No.: PCT/CN2020/084824
§ 371 (c)(1),
(2) Date: May 22, 2020

(87) PCT Pub. No.: WO2021/196284
PCT Pub. Date: Oct. 7, 2021

(65) Prior Publication Data
US 2022/0113574 A1 Apr. 14, 2022

(30) Foreign Application Priority Data
Apr. 1, 2020 (CN) .......................... 202010250719.6

(51) Int. Cl.
*G02F 1/1368* (2006.01)
*G02F 1/1362* (2006.01)

(52) U.S. Cl.
CPC ...... *G02F 1/1368* (2013.01); *G02F 1/136222* (2021.01); *G02F 1/136286* (2013.01)

(58) Field of Classification Search
CPC ............. G02F 1/1368; G02F 1/136222; G02F 1/136286; G02F 1/134345
See application file for complete search history.

(56) References Cited

U.S. PATENT DOCUMENTS

2018/0129110 A1  5/2018  Syn et al.
2020/0004069 A1  1/2020  Kim et al.

FOREIGN PATENT DOCUMENTS

| CN | 107966835 A | 4/2018 |
| CN | 108073006 A | 5/2018 |
| CN | 110646994 A | 1/2020 |
| KR | 20040026959 A | 4/2004 |

*Primary Examiner* — James A Dudek
(74) *Attorney, Agent, or Firm* — PV IP PC; Wei Te Chung; Ude Lu

(57) ABSTRACT

A liquid crystal display panel includes an array substrate and a color filter substrate. Each of the pixel units includes a thin film transistor layer and a pixel electrode disposed on the thin film transistor layer. The pixel electrode includes a first pixel electrode and a second pixel electrode, and a spacing region disposed between the first pixel electrode and the second pixel electrode.

8 Claims, 13 Drawing Sheets

LIQUID CRYSTAL DISPLAY PANEL

BACKGROUND OF INVENTION

Field of Invention

The present invention relates to a display technology, and more particularly, to a liquid crystal display panel.

Description of Prior Art

MVA (Multi Vertical Alignment) liquid crystal display panel has been widely used due to their advantages of high contrast and wide viewing angle. The liquid crystal display panel generally comprises an array substrate and a color filter substrate that are oppositely disposed. A liquid crystal layer is disposed between the array substrate and the color filter substrate. A pixel electrode is disposed on the array substrate, and a common electrode is disposed on the color filter substrate. The electric field between the pixel electrode and the common electrode drives the liquid crystal to rotate. Each of the pixel units on the array substrate generally comprises a light-transmission area and a non-light-transmission area. The light-transmission area is used for disposing a pixel electrode, and the non-light-transmission area is an arrangement of metal traces used for signal transmission such as connecting lines.

In the MVA liquid crystal display panel, the light-transmission area comprises a main area and the sub-area, and the main area and the sub-area are disposed on the same side of the non-light-transmission area. The main pixel electrode in the main area and the sub-pixel electrode in the sub-area are arranged at intervals.

However, since the voltage of the main pixel electrode is different from the voltage of the sub-pixel electrode, the electric field between the main pixel electrode and the common electrode is different from the electric field between the sub-pixel electrode and the common electrode. The liquid crystal at the spacing region between the pixel electrode and sub-pixel electrode will be tilted at a large angle under differential pressure, resulting in dark lines at the spacing region, and affecting the transmittance of the liquid crystal display panel.

The technical problem of the conventional liquid crystal display panel is that the liquid crystal at the spacing region between the pixel electrode and sub-pixel electrode would be tilted at a large angle under differential pressure, resulting in dark lines at the spacing region.

SUMMARY OF INVENTION

To solve the abovementioned technical problems, the solution provided by the present disclosure is shown as follows:

In a first aspect, the present disclosure provides a liquid crystal display panel, comprising:

an array substrate, comprising a first substrate and a plurality of pixel units arrayed on the first substrate;

a color filter substrate disposed opposite to the array substrate, and he color filter substrate comprises a second substrate and a common electrode disposed on the second substrate and opposite to the pixel units;

a liquid crystal layer disposed between the array substrate and the color filter substrate;

each of the pixel units comprises a thin film transistor layer and a pixel electrode disposed on the thin film transistor layer, and the pixel electrode comprises a first pixel electrode, a second pixel electrode, and a spacing region disposed between the first pixel electrode and the second pixel electrode, and the first pixel electrode is a main pixel electrode, and the second pixel electrode is a secondary pixel electrode.

In one embodiment, the liquid crystal display panel comprises a first electromagnetic shielding wire. An orthographic projection of the first electromagnetic shielding wire on the pixel electrode is located at the spacing region between the first pixel electrode and the second pixel electrode. A voltage input to the first electromagnetic shielding wire is the same as a voltage input to the common electrode.

In one embodiment, the second pixel electrode is disposed along an outer boundary of the first pixel electrode.

In one embodiment, a routing area is disposed between adjacent two of the pixel units. An enclosed area is formed between the second pixel electrode and the routing area, and the first pixel electrode is disposed in the enclosed area.

In one embodiment, the second pixel electrode comprises a main portion and an extending portion connected to the main portion. The main portion and the first pixel electrode are disposed along the row direction of the pixel units, and the extending portion and the first pixel electrode are disposed along the column direction of the pixel units.

In one embodiment, the first electromagnetic shielding wire comprises a first shielding wire disposed along the column direction of the pixel units, and an orthographic projection of the first shielding wire on the pixel electrode is disposed between the first pixel electrode and the main portion.

In one embodiment, a reinforced wire is disposed along the row direction of the pixel units on the first shielding wire, and a plurality of the reinforced wires is arranged at intervals along the column direction of the pixel units.

In one embodiment, the first electromagnetic shielding wire comprises a second shielding wire disposed along the row direction of the pixel units, and an orthographic projection of the second shielding wire on the pixel electrode is disposed between the first pixel electrode and the extending portion.

In one embodiment, the thin film transistor layer comprises a second electromagnetic shielding wire disposed along the row direction of the pixel units. The second electromagnetic shielding wire is disposed along the outer boundary of the second pixel electrode. A voltage input to the second electromagnetic shielding wire is the same as a voltage input to the common electrode.

In one embodiment, the thin film transistor layer comprises a first metal layer disposed on the first substrate, and the first electromagnetic shielding wire and the first metal layer are disposed on a same layer.

In a second aspect, the present disclosure further discloses a liquid crystal display panel, comprising:

an array substrate, comprising a first substrate and a plurality of pixel units arrayed on the first substrate;

a color filter substrate disposed opposite to the array substrate, and the color filter substrate comprises a second substrate and a common electrode disposed on the second substrate and opposite to the pixel units;

a liquid crystal layer disposed between the array substrate and the color filter substrate;

each of the pixel units comprises a thin film transistor layer and a pixel electrode disposed on the thin film transistor layer, and the pixel electrode comprises a first pixel electrode, a second pixel electrode, and a spacing region disposed between the first pixel electrode and the second pixel electrode.

In one embodiment, the thin film transistor layer comprises a first electromagnetic shielding wire. An orthographic projection of the first electromagnetic shielding wire on the pixel electrode is located at the spacing region between the first pixel electrode and the second pixel electrode. A voltage input to the first electromagnetic shielding wire is the same as a voltage input to the common electrode.

In one embodiment, the second pixel electrode is disposed along an outer boundary of the first pixel electrode.

In one embodiment, a routing area is disposed between adjacent two of the pixel units. An enclosed area is formed between the second pixel electrode and the routing area, and the first pixel electrode is disposed in the enclosed area.

In one embodiment, the second pixel electrode comprises a main portion and an extending portion connected to the main portion. The main portion and the first pixel electrode are disposed along the row direction of the pixel units. The extending portion and the first pixel electrode are disposed along the column direction of the pixel units.

In one embodiment, the first electromagnetic shielding wire comprises a first shielding wire disposed along the row direction of the pixel units, and an orthographic projection of the first shielding wire on the pixel electrode is disposed between the first pixel electrode and the main portion.

In one embodiment, a reinforced wire is disposed along the row direction of the pixel units on the first shielding wire, and a plurality of the reinforced wires is arranged at intervals along the column direction of the pixel units.

In one embodiment, the first electromagnetic shielding wire comprises a second shielding wire disposed along the row direction of the pixel units, and an orthographic projection of the second shielding wire on the pixel electrode is disposed between the first pixel electrode and the extending portion.

In one embodiment, the thin film transistor layer comprises a second electromagnetic shielding wire disposed along the row direction of the pixel units. The second electromagnetic shielding wire is disposed along the outer boundary of the second pixel electrode, and a voltage input to the second electromagnetic shielding wire is the same as a voltage input to the common electrode.

In one embodiment, the thin film transistor layer comprises a first metal layer disposed on the first substrate, and the first electromagnetic shielding wire and the first metal layer are disposed on a same layer.

The beneficial effects of the present disclosure are that by increasing the distance between the first pixel electrode and the second pixel electrode, by disposing a first electromagnetic shielding wire at the spacing region between the first pixel electrode and the second pixel electrode, and by setting the voltage of the first electromagnetic shielding wire to be the same as the voltage of the common electrode to reduce the effect of the electric field between the edge area of the first pixel electrode and the common electrode, and the electric field between the edge area of the second pixel electrode and the common electrode on the liquid crystal at the spacing region. At this time, since there is no differential pressure at the spacing region, the liquid crystal at the spacing region will not be tilted, and provide a binding effect on the liquid crystal at the spacing region, avoiding the liquid crystal at the spacing region generating a large angle under the effect of the electric field, and avoiding forming the dark lines at the spacing region 70.

BRIEF DESCRIPTION OF DRAWINGS

In order to more clearly illustrate the technical solutions in the embodiments of the present invention, the drawings used in the description of the embodiments will be briefly described below. It is obvious that the drawings in the following description are only some embodiments of the present invention. Other drawings can also be obtained from those skilled persons in the art based on these drawings without paying any creative effort.

REFERENCE NUMBERS

Figure 1:
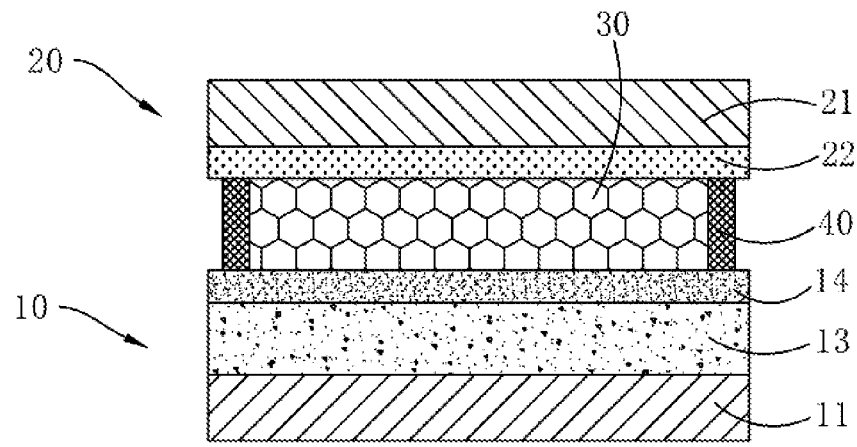
FIG. 1 is a schematic view of the structure of the liquid display panel according to one embodiment of the present disclosure.

First substrate 11; pixel units 12; thin film transistor layer 13; active layer 131; gate insulation layer 132; gate electrode 133a; scanning line 133b; first insulation layer 134; source-drain electrode 135a; data line 135b; second insulation layer 136; first shielding wire 137a; reinforced wires 137b; second shielding wire 137c; second electromagnetic shielding wire 138; pixel electrode 14; first pixel electrode 141; second pixel electrode 142; main portion 142a; extending portion 142b; color filter substrate 20; second substrate 21; common electrode 22; liquid crystal layer 30; frame glue 40; routing area 50; enclosed area 60; spacing region 70; first connecting wire 81; second connecting wire 82; third connecting wire 83.

DETAILED DESCRIPTION OF PREFERRED EMBODIMENTS

The description of each of the following embodiments is provided with reference to the appending drawings to exemplify the specific embodiment that may be implemented. The directional terms, such as "upper," "lower,", "front", "back", "left," "right," "inside," "outside," and "lateral side" are based on the orientation or positional relationship shown in the drawings, and the terms are merely for convenience of description of the present invention, and thus they are not to be construed as limiting. In the drawings, elements with similar structure are denoted by the same reference symbols.

The present disclosure is directed to the conventional liquid crystal display panel in which the liquid crystal at the space between the main pixel electrode and the sub-pixel electrode will be tilted at a large angle under the effect of the electric field, resulting in the technical problem of dark lines at the spacing region. Present application can solve the above problems.

Figure 2:
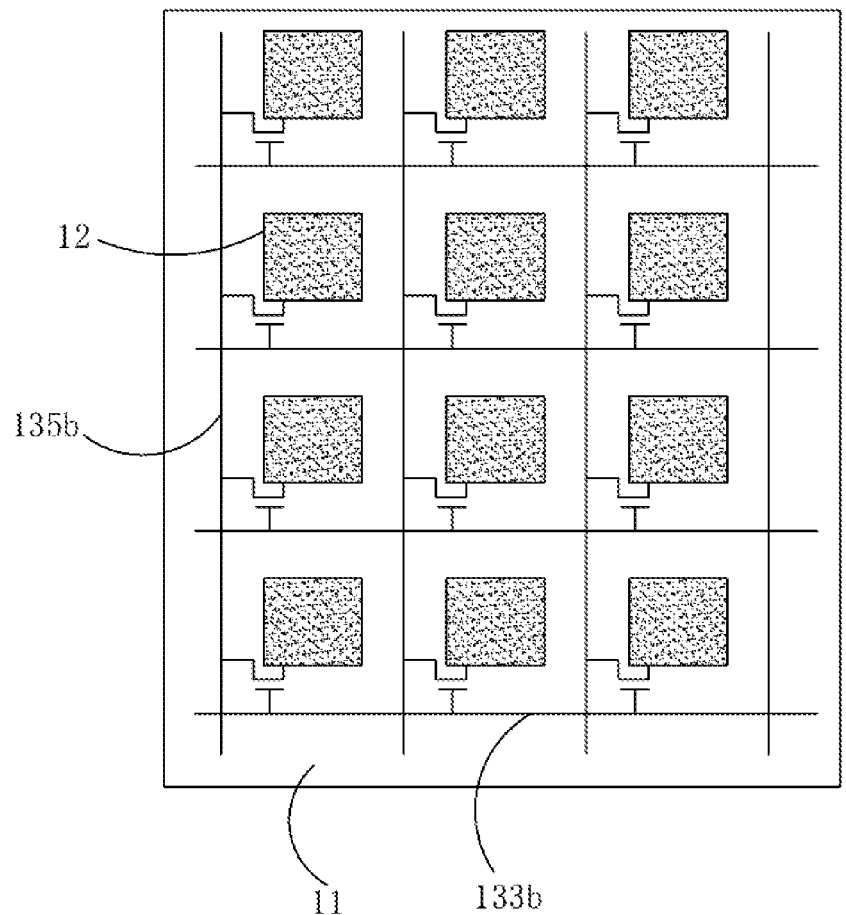
FIG. 2 is a schematic view of the arrangement of the pixel units according to one embodiment of the present disclosure.

Referring to FIG. 1 and FIG. 2, a liquid crystal display panel comprises an array substrate 10, a color filter substrate 20, and a liquid crystal layer 30. The color filter substrate 20 is disposed opposite to the array substrate 10. The liquid crystal layer 30 is disposed between the array substrate 10 and the color filter substrate 20. A frame glue 40 is disposed between the array substrate 10 and the color crystal layer 30. A chamber is formed between the frame glue 40 and the array substrate 10 and the color filter substrate 20 for accommodating the liquid crystal layer 30.

Specifically, the array substrate 10 comprises a first substrate 11 and a plurality of pixel units 12 arrayed on the first substrate 11. Each of the pixel units 12 comprises a thin film transistor layer 13 and a pixel electrode 14 disposed on the thin film transistor layer 13. The color filter substrate 20 comprises a second substrate 21 and a common electrode 22 disposed on the second substrate 21 and opposite to the pixel units 12. The electric field formed by the differential voltage between the pixel electrode 14 and the common electrode 22 drives the liquid crystal of the liquid crystal layer 30 to rotate.

Figure 3:
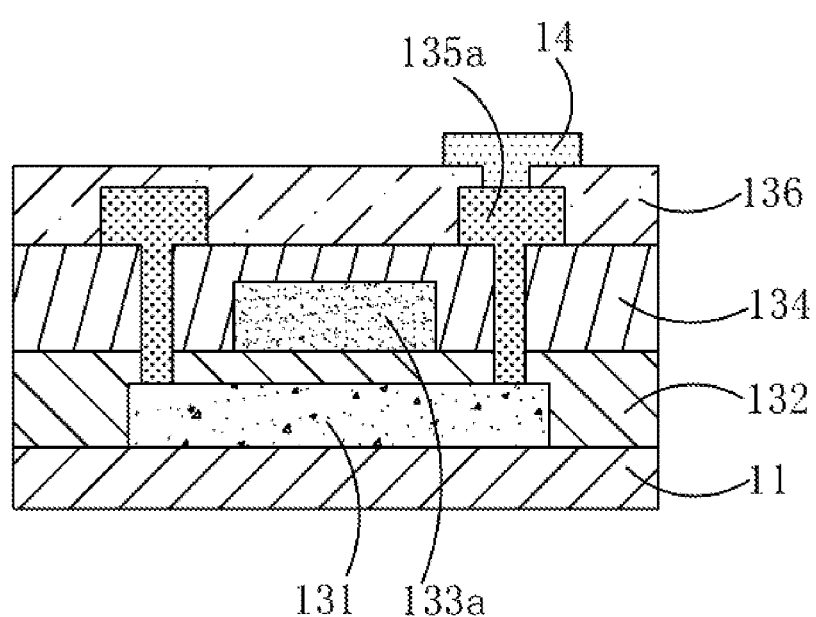
FIG. 3 is a schematic view of the layer structure of the array substrate according to one embodiment of the present disclosure.

Specifically, referring to FIG. 2 and FIG. 3, in one embodiment, the thin film transistor layer 13 comprises an active layer 131 disposed on the first substrate 11, a gate insulation layer 132 covered the active layer 131, a first metal layer disposed on the gate insulation layer 132, a first insulation layer 134 covered the first metal layer, and a second insulation layer 136 covered the second metal layer.

Specifically, the first metal layer comprises a gate 133a and a scanning line 133b. The second metal layer comprises a source-drain electrode 135a and a data line 135b. The pixel electrode 14 is disposed on the second insulation layer 136, and the pixel electrode 14 is electronically connected to the source-drain electrode 135a through a via hole.

Specifically, the data line 135b is disposed along the column direction of the pixel units 12, and a plurality of the data lines 135b is arranged at intervals along the column direction of the pixel units 12. The scanning line 133b is disposed along the column direction of the pixel units 12, and a plurality of the scanning lines 133b is arranged at intervals along the row direction of the pixel units 12. The limited area defined by the intersection between adjacent two of the data line 135b and adjacent two of the scanning line 133b is a pixel area of one of the pixel units 12.

In one embodiment, one row of the scanning line 133b is corresponding to one column of the pixel units 12 and electrically connected with each other for the scanning signal to the pixel units 12. One row of the scanning line 133b is corresponding to one column of the pixel units 12 and electrically connected with each other for the data signal to the pixel units 12.

Figure 4:
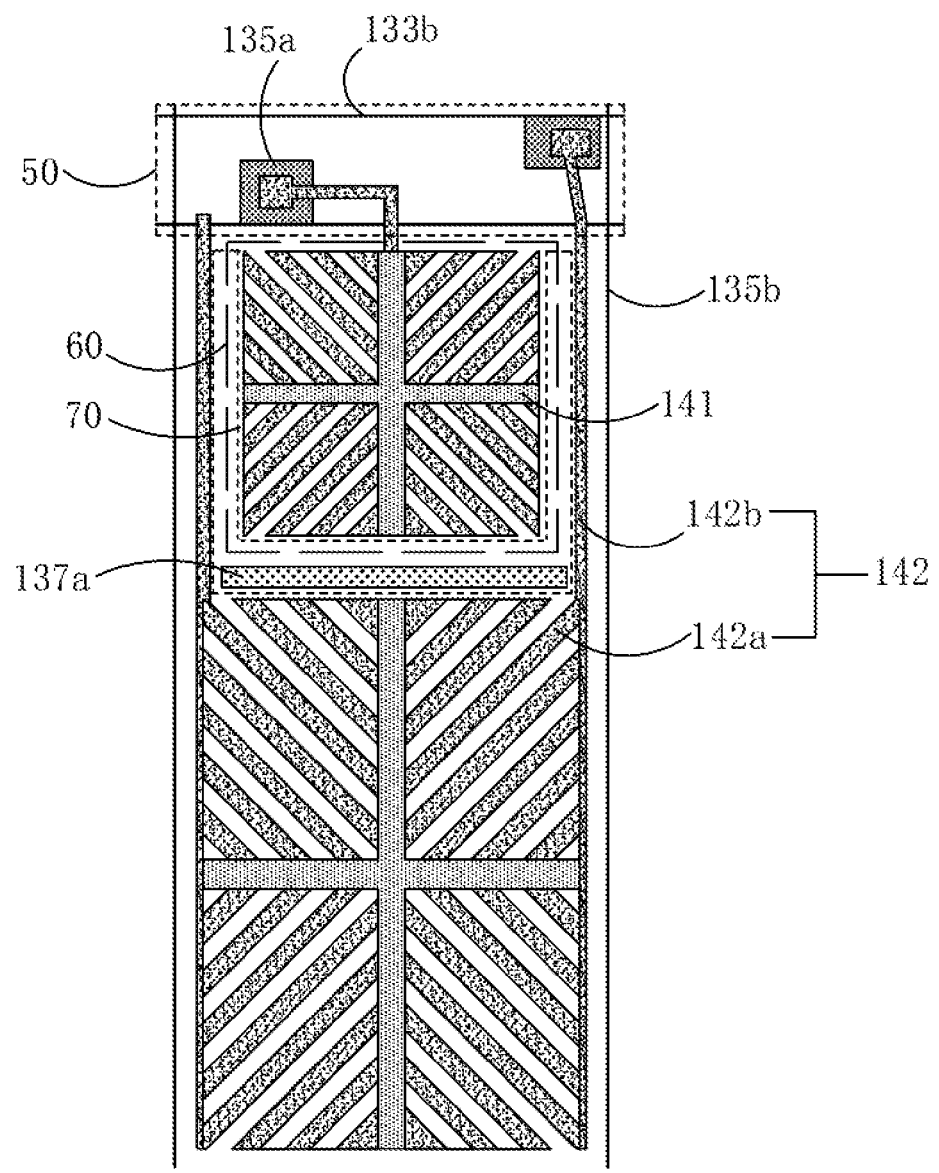
FIG. 4 is a schematic view of the pixel units according to the first embodiment of the present disclosure.

Specifically, referring to FIG. 4, a routing area 50 is disposed between adjacent two of the pixel units 12. The routing area 50 is used for arrangement of signal routing for transmitting signals, such as the scanning line 133b.

Specifically, the pixel electrode 14 comprises a first pixel electrode 141 and a second pixel electrode 142. The first pixel electrode 141 and the second pixel electrode 142 are disposed on the same side of the routing area 50.

The differential voltage between the two column of the pixel units 12 is reduced or even eliminated by disposing the first pixel electrode 141 and the second pixel electrode 142 on the same side of the routing area 50, and providing enough space distance between the two column of the pixel units 12 by the routing area 50. It may prevent the liquid crystal at the junction from tilting caused by the effect of the differential voltage, and avoid the dark lines being formed at the junction of the two column of the pixel units 12.

Further, the second pixel electrode 142 is disposed along the outer boundary of the first pixel electrode 141. An enclosed area 60 is formed between the second pixel electrode 142 and the routing area 50, and the first pixel electrode 141 is disposed in the enclosed area 60.

It should be noted that a structure that surrounds or semi-encloses the first pixel electrode 141 is formed by disposing the second pixel electrode 142 along the outer boundary of the first pixel electrode 141. The differential voltage between the two column of the pixel units 12 may be reduced or even eliminated. It may the dark lines being formed at the junction of the two column of the pixel units 12, and may reduce the width of the routing area 50 between the two column of adjacent pixel units 12 to enhance the pixel aperture ratio.

Specifically, a spacing region 70 is formed between the first pixel electrode 141 and the second pixel electrode 142.

In one embodiment, the distance between the first pixel electrode 141 and the second pixel electrode 142 is larger than 7 µm. The distance between the first pixel electrode 141 and the second pixel electrode 142 may be 9-10 µm to reduce the effect of the electric field between the peripheral region of the first pixel electrode 141 and the common electrode 22, and the electric field between the peripheral region of the second pixel electrode 142 and the common electrode 22 on the liquid crystal. It may prevent the liquid crystal at the spacing region 70 from being tilted at larger angle under the effect of the electric field, and forming the dark lines at the spacing region 70.

Specifically, the thin film transistor layer 13 comprises a first electromagnetic shielding wire. An orthographic projection of the first electromagnetic shielding wire on the pixel electrode 14 is located at the spacing region 70 between the first pixel electrode 141 and the second pixel electrode 142. The voltage input to the first electromagnetic shielding wire is the same as a voltage input to the common electrode 22. A voltage input to the first pixel electrode 141 is different from a voltage input to the second pixel electrode 142.

It should be noted that the effect of the electric field between the peripheral region of the first pixel electrode 141 and the common electrode 22, and the electric field between the peripheral region of the second pixel electrode 142 and the common electrode 22 on the liquid crystal at the spacing region may be reduced by disposing the first electromagnetic shielding wire at the spacing region 70 between the first pixel electrode 141 and the second pixel electrode 142, and by setting the voltage of the first electromagnetic shielding wire to the same as the voltage of the common electrode 22. It may prevent the liquid crystal at the spacing region 70 from tilting at a large angle under the effect of the electric field, resulting in dark line at the spacing region 70.

Specifically, the second pixel electrode 142 comprises a main portion 142a and an extending portion 142b connected to the main portion 142a. The main portion 142a and the first pixel electrode 141 are disposed along the row direction of the pixel units 12, and the extending portion 142b and the first pixel electrode 141 are disposed along the column direction of the pixel units 12.

There are two the extending portions 142b, and each of the extending portions 142b is disposed on both sides of the first pixel electrode 141, respectively.

In the first embodiment, the electromagnetic shielding wire comprises a first shielding wire 137a disposed along the column direction of the pixel units 12. An orthographic projection of the first shielding wire 137a on the pixel electrode 14 is disposed between the first pixel electrode 141 and the main portion 142a. It may prevent the liquid crystal at the spacing region 70 between the first pixel electrode 141 and the main portion 142a from being tilted at larger angle under the effect of the differential voltage.

In one embodiment, the width of the first shielding wire 137a may be 0.2-5 μm. In another embodiment, the width of the first shielding wire 137a may also be 1-3 μm.

It should be noted that the overall shape of the first shielding line 137a may be linear, curved, or wave-shaped.

Figure 5:
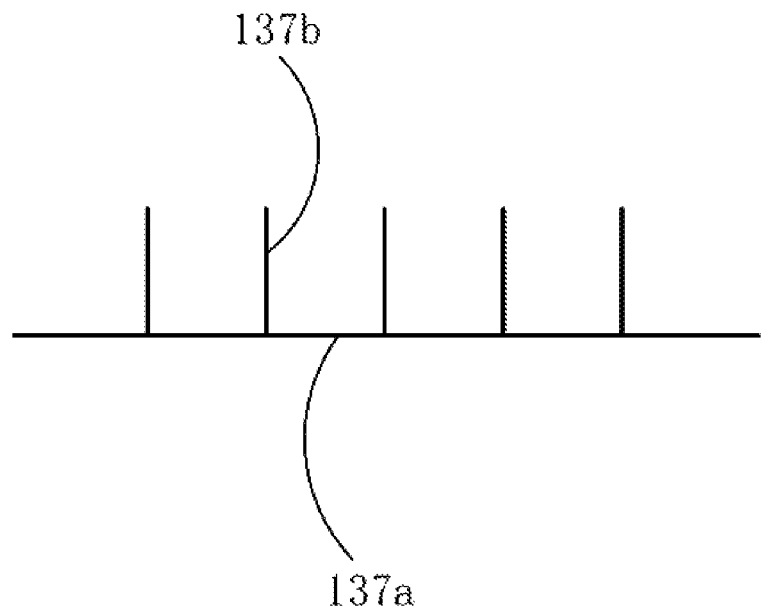
FIG. 5 is a schematic view of the arrangement of the reinforced wire on the first shielding wire according to one embodiment of the present disclosure.
Figure 6:
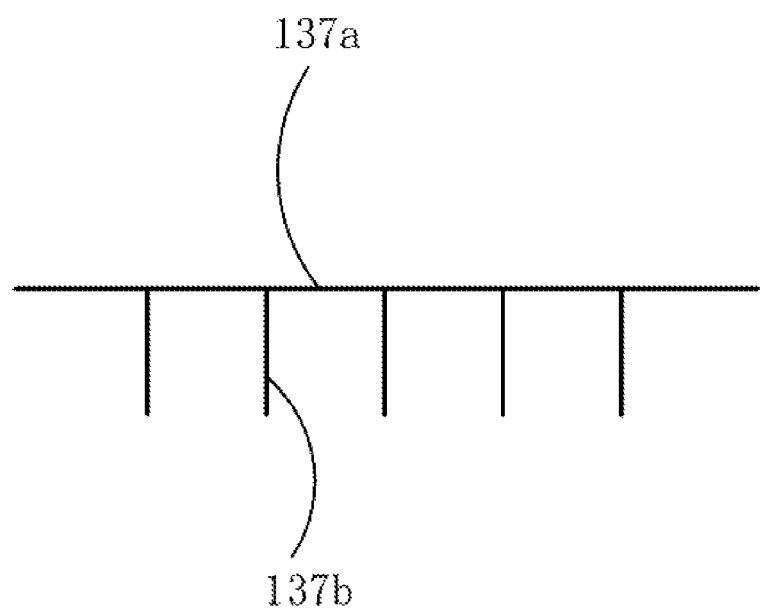
FIG. 6 is a schematic view of the arrangement of the reinforced wire on the first shielding wire according to one embodiment of the present disclosure.
Figure 7:
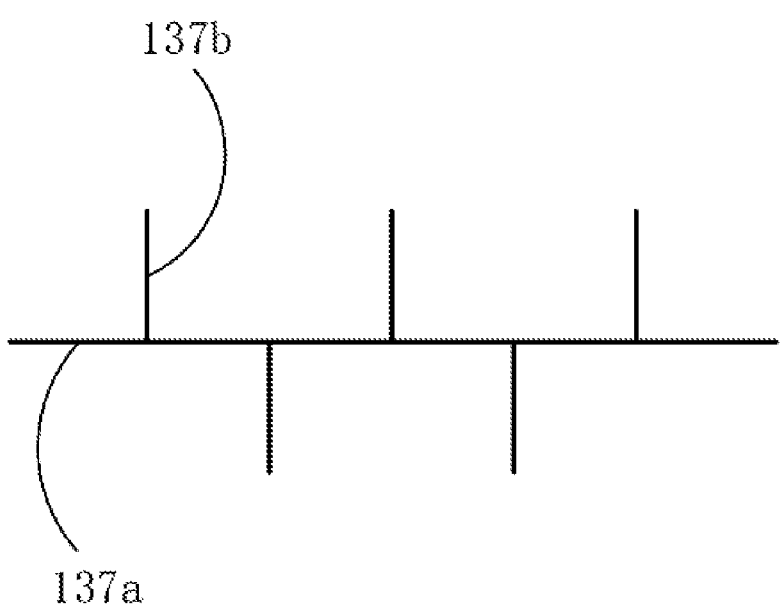
FIG. 7 is a schematic view of the arrangement of the reinforced wire on the first shielding wire according to another embodiment of the present disclosure.

Specifically, referring to FIGS. 5 to 7, a reinforced wire 137a is disposed along the row direction of the pixel units 12 on the first shielding wire 137a, and a plurality of the reinforced wires 137b is arranged at intervals along the column direction of the pixel units 12.

It should be noted that the first shielding wire 137a is relatively slender. The width at the pre-set position of the first shielding wire 137a may be raised to prevent the first shielding wire 137a form being broken by disposing a plurality of reinforcing wires 137b at the pre-set position of the first shielding wire 137a. The pre-set position may be a portion of the first shielding wire 137a that is susceptible to external force or easy to be broken.

It should be noted that the width of the reinforcing wires 137b may be the same. The width of the reinforcing wire 137b may also be adjusted based on the actual position of the reinforcing wire 137b.

Specifically, the length of the reinforcing wire 137b may be longer than 3 μm. The distance between adjacent two of the reinforcing wires 137b may be larger than or equal to the length along the column direction of the two pixel units 12. The distance between adjacent two of the reinforcing wires 137b is less than or equal to the length along the column direction of the ten pixel units 12. That is, as the length along the column of the pixel units 12 is "a", the distance between adjacent two of the reinforcing wires 137b is larger than or equal to two times of "a", and the distance between adjacent two of the reinforcing wires 137b is less than or equal to ten times of "a".

In one embodiment, referring to FIG. 5 and FIG. 6, the reinforcing wires 137b are disposed on the same side of the first shielding wire 137a.

In one embodiment, referring to FIG. 5, all of the reinforcing wires 137b are disposed on the same side of the first shielding wire 137a closed to the first pixel electrode 141. The distance between adjacent two of the reinforcing wires 137b is larger than or equal to the length along the column direction of the five pixel units 12, and the distance between adjacent two of the reinforcing wires 137b is less than or equal to the length along the column direction of the ten pixel units 12.

Referring to FIG. 6, all of the reinforcing wires 137b are disposed on the side of the first shielding wire 137a away from the first pixel electrode 141. The distance between adjacent two of the reinforcing wires 137b is larger than or equal to the length along the column direction of the two pixel units 12, and the distance between adjacent two of the reinforcing wires 137b is less than or equal to the length along the column direction of the ten pixel units 12.

In another embodiment, referring to FIG. 7, the reinforcing wires 137b is disposed on both sides of the first shielding wire 137a facing away. That is, reinforcing wires 137b are disposed on both sides of the first shielding wire 137a facing away.

Further, the reinforcing wires 137b on the back sides of the first shielding wire 137a are alternately arranged. The distance between adjacent two of the reinforcing wires 137b is larger than or equal to the length along the column direction of the five pixel units 12, and the distance between adjacent two of the reinforcing wires 137b is less than or equal to the length along the column direction of the ten pixel units 12.

Figure 8:
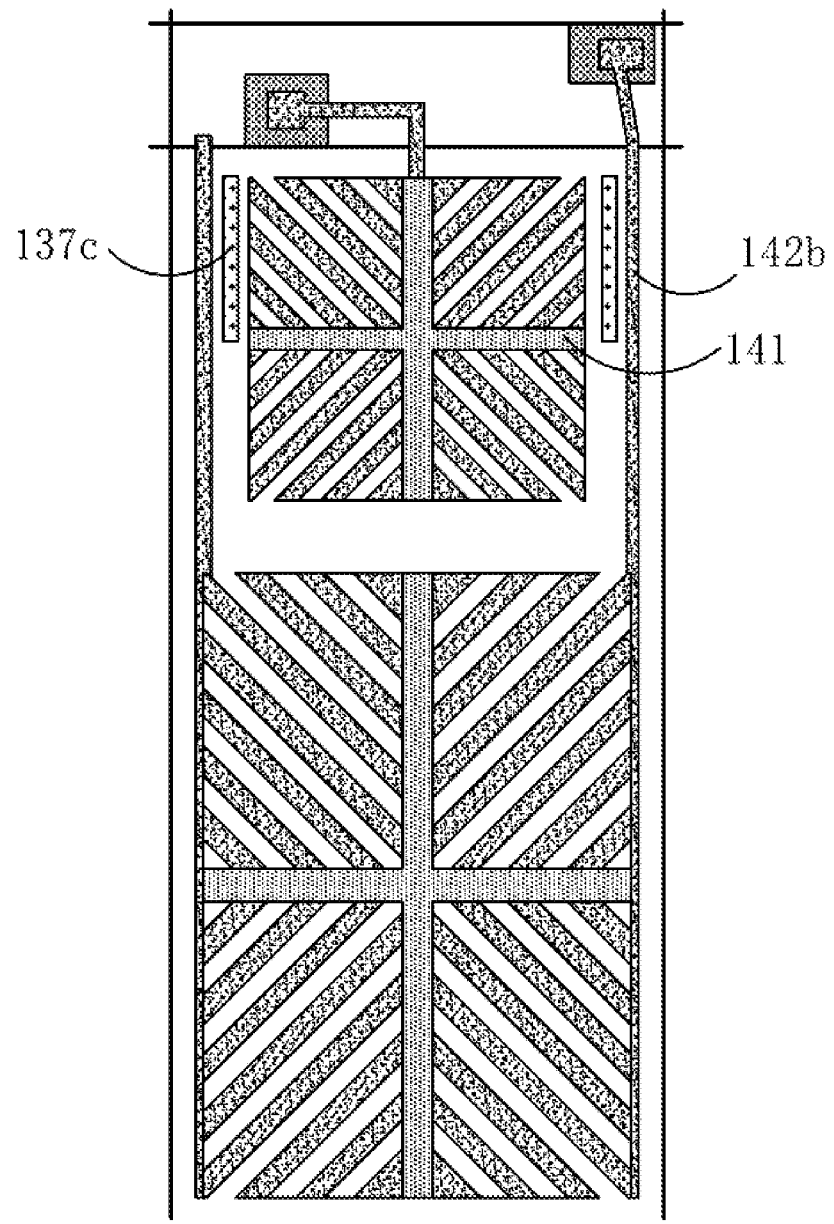
FIG. 8 is a schematic view of the structure of the pixel units according to the second embodiment of the present disclosure.
Figure 9:
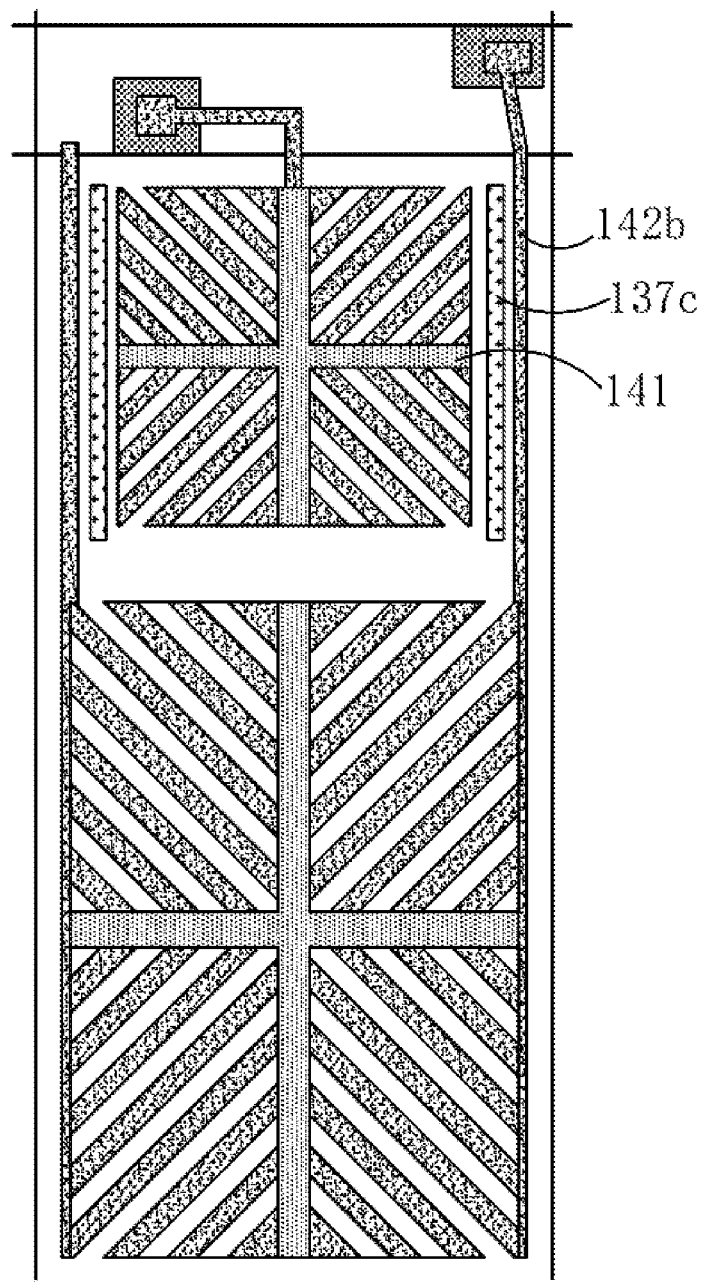
FIG. 9 is a schematic view of the structure of the pixel units according to the second embodiment of the present disclosure.

Referring to FIG. 8 and FIG. 9, in the second embodiment, the first electromagnetic shielding wire comprises a second shielding wire 137c disposed along the row direction of the pixel units 12. An orthographic projection of the second shielding wire 137c on the pixel electrode 14 is disposed between the first pixel electrode 141 and the extending portion 142b.

In one embodiment, the second shielding wire 137c are disposed between the first pixel electrode 141 and any one of the extending portion 142b. Two of the second shielding wire 137c may be disposed, and the two of the second shielding wire 137c may be disposed between the first pixel electrode 141 and the extending portion 142b.

In one embodiment, the length of the second shielding wire 137c may be shorter than the length along the row direction of the first pixel electrode 141 (referring to FIG. 8). The length of the second shielding wire 137c may be longer than or equal to the length along the row direction of the first pixel electrode 141 (referring to FIG. 9).

It should be noted that the overall shape of the second shielding wire 137c may be linear, curved, or wave-shaped.

Figure 10:
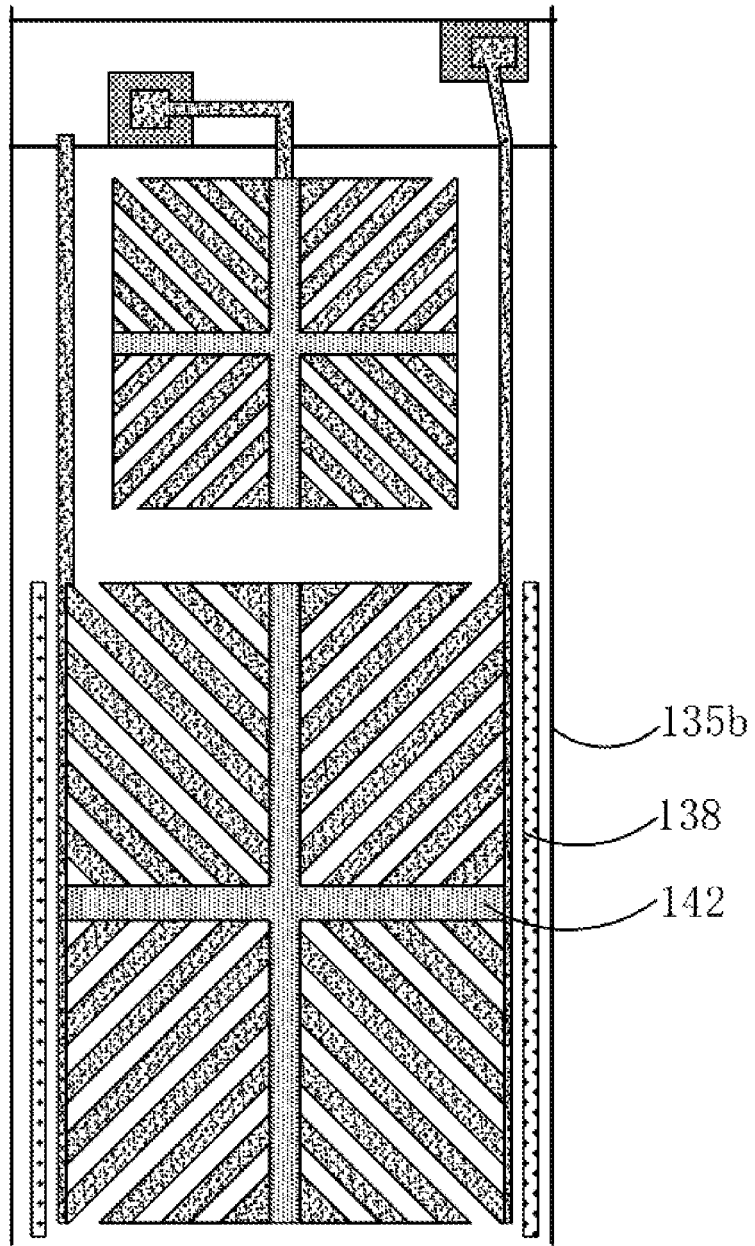
FIG. 10 is a schematic view of the structure of the pixel units according to the third embodiment of the present disclosure.

Referring to FIG. 10, in the third embodiment, the thin film transistor layer 13 further comprises a second electromagnetic shielding wire 138 disposed along the row direction of the pixel units 12. The second electromagnetic shielding wire 138 is disposed along the outer boundary of the second pixel electrode 142. A voltage input to the second electromagnetic shielding wire 138 is the same as a voltage input to the common electrode 22, preventing the liquid crystal at the area between the two rows of adjacent pixel units 12 from tilting at larger anger under the differential voltage and resulting in dark lines formation.

It should be noted that FIG. 10 merely illustrates the second electromagnetic shielding wire 138 being disposed on the outer boundary of the main portion 142a. In another embodiment, the second electromagnetic shielding wire 138 may also be disposed on the outer boundary of the extending portion 142b, and the second electromagnetic shielding wire 138 may also be disposed on the outer boundary of the main portion 142a and on the outer boundary of the extending portion 142b.

Figure 11:
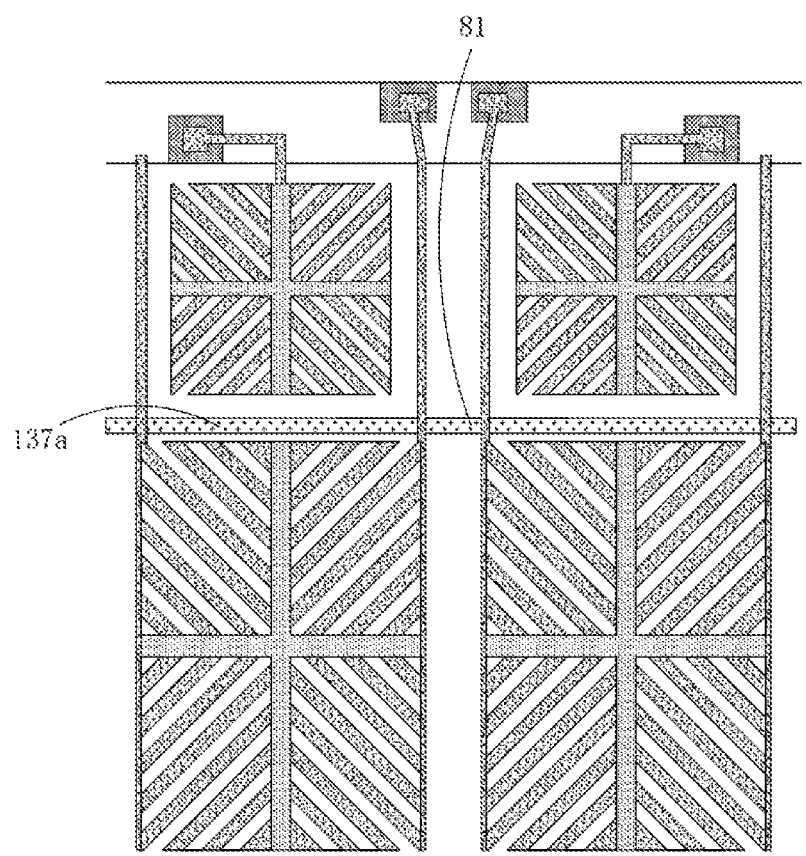
FIG. 11 is a schematic view of the arrangement of adjacent two of the rows of the pixel units according to the first embodiment of the present disclosure.

Referring to FIG. 11, the two first shielding wire 137a on adjacent two of the pixel units 12 may be electrically connected by a first connecting wire 81. The first connecting wire 81 may be disposed on a same layer as the first shielding wire 137a and integrally formed. The first connecting wire 81 may also be formed on different layers and formed of different materials with the first shielding wire 137a to avoid hindering the arrangement of other routing.

In one embodiment, the overall shape of the first connecting wire 81 may be linear, curved, or wave-shaped.

Figure 12:
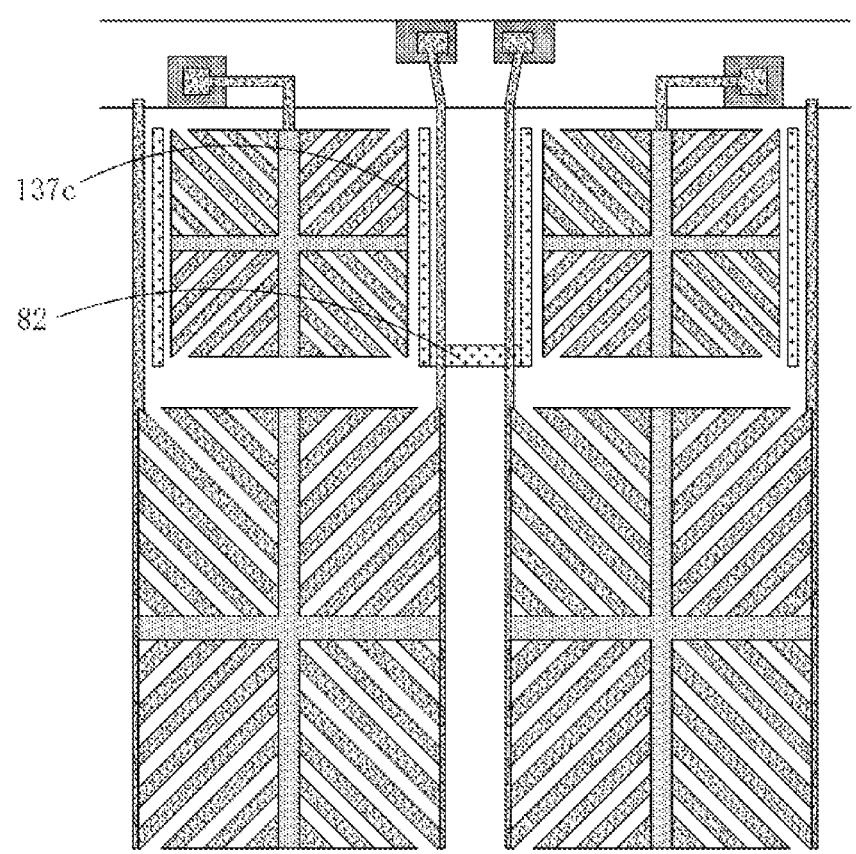
FIG. 12 is a schematic view of the arrangement of adjacent two of the rows of the pixel units according to the second embodiment of the present disclosure.

Referring to FIG. 12, the two second shielding wire 137c on adjacent two of the pixel units 12 may be electrically connected by a second connecting wire 82. The second connecting wire 82 may be disposed on a same layer as the second shielding wire 137c and integrally formed. The second connecting wire 82 may also be formed on different layers and formed of different materials with the second shielding wire 137c.

In one embodiment, the overall shape of the second connecting wire 82 may be linear, curved, or wave-shaped.

Figure 13:
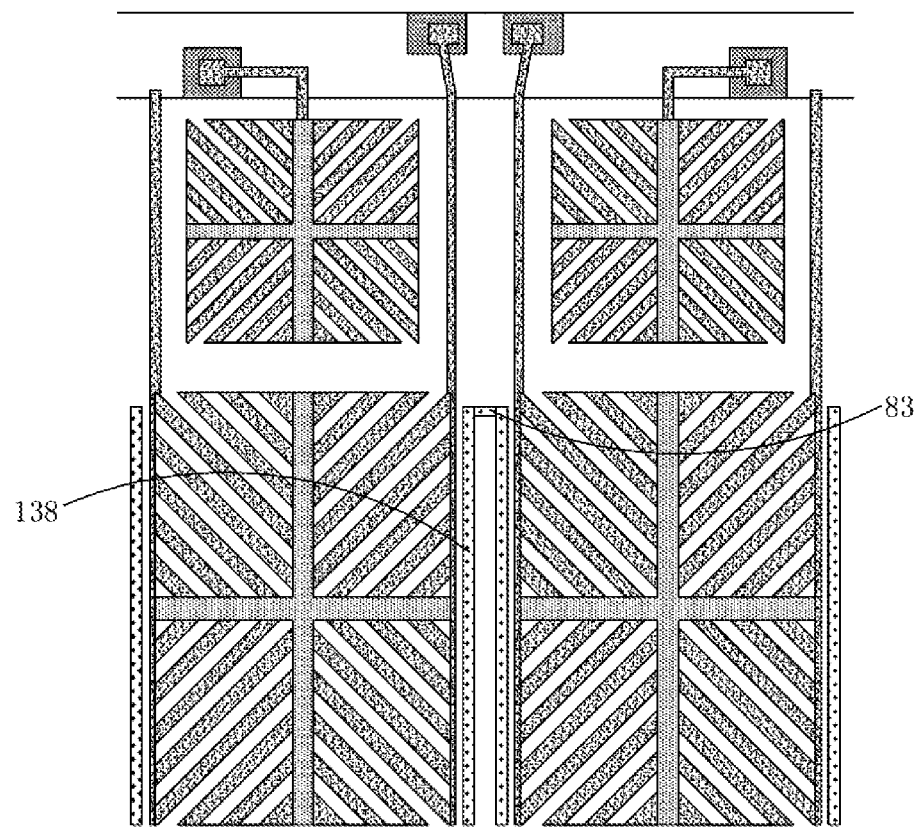
FIG. 13 is a schematic view of the arrangement of adjacent two of the rows of the pixel units according to the third embodiment of the present disclosure.

Referring to FIG. 13, the second electromagnetic shielding wire 138 on adjacent two of the pixel units 12 may be electrically connected by a third connecting wire 83. The third connecting wire 83 may be disposed on a same layer as the second electromagnetic shielding wire 138 and integrally formed. The third connecting wire 83 may also be formed on different layers and formed of different materials with the second electromagnetic shielding wire 138.

In one embodiment, the overall shape of the third connecting wire 83 may be linear, curved, or wave-shaped.

It should be noted that the FIGS. 11 to 13 merely illustrates the case where first shielding wire 137a, the second shielding wire 137c, or the second electromagnetic shielding wire 138 is disposed.

Figure 14:
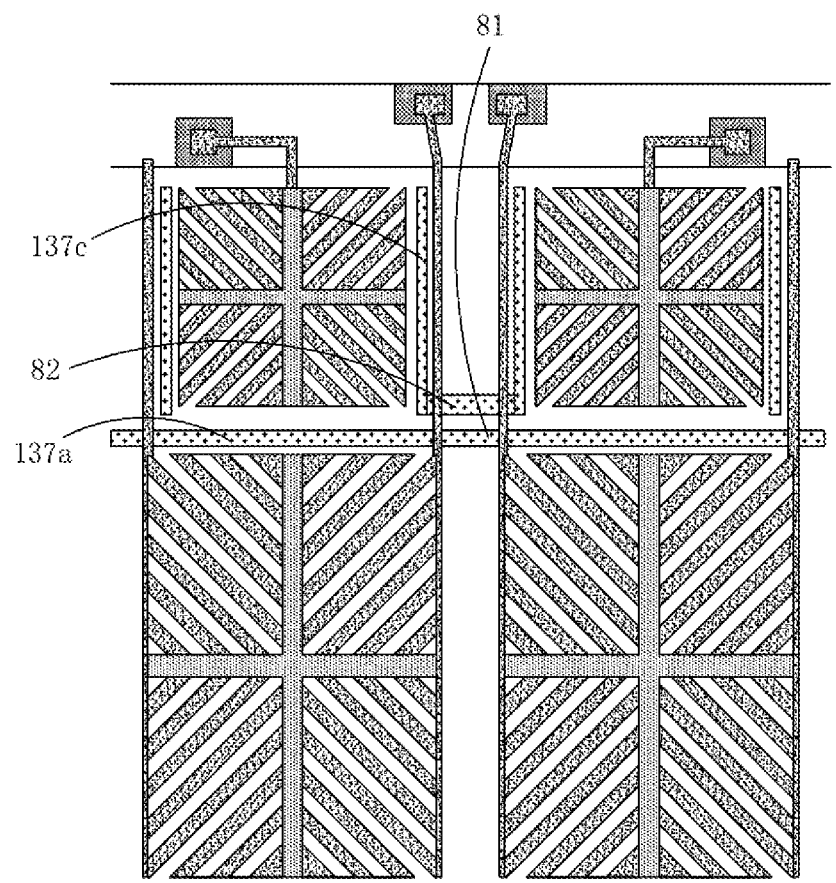
FIG. 14 is a schematic view of the arrangement of the adjacent two of the rows of the pixel units according to the fourth embodiment of the present disclosure.

Specifically, referring to FIG. 14, the first shielding wire 137a and the second shielding wire 137c may also be disposed at the same time. The first shielding wire 137a may be dispose apart from the second shielding wire 137c, preventing the pixel aperture ratio from reducing. The first shielding wire 137a may also be connected to the second shielding wire 137c for providing better shielding effect.

Figure 15:
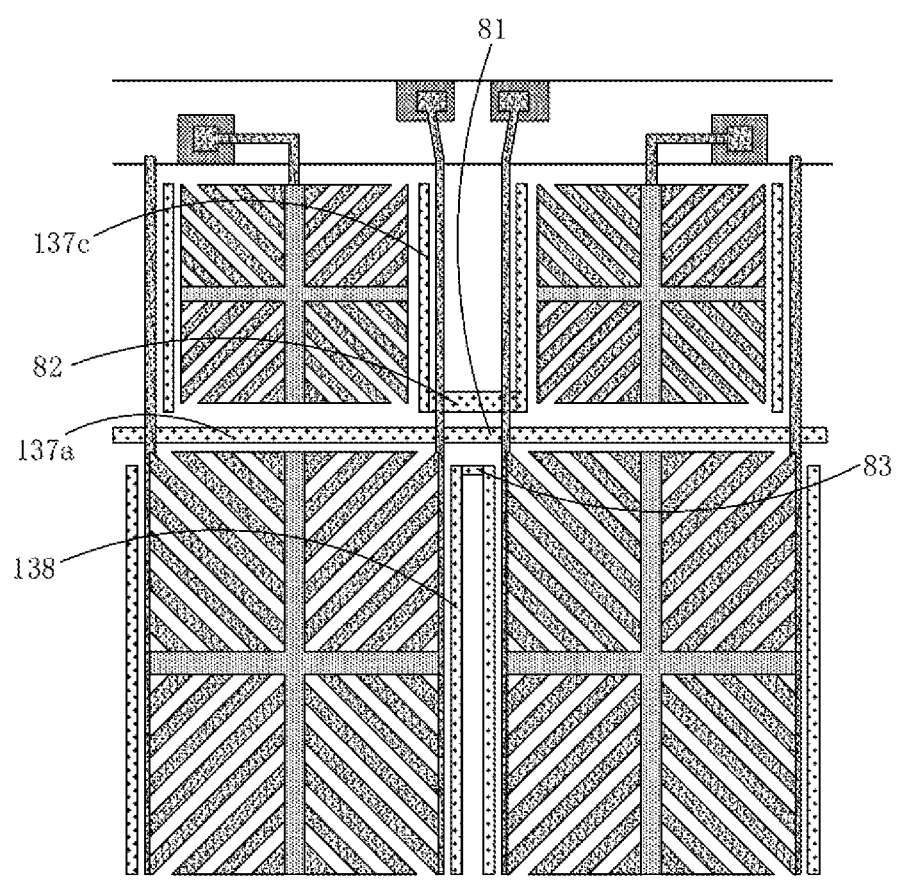
FIG. 15 is a schematic view of the arrangement of the adjacent two of the rows of the pixel units according to the fifth embodiment of the present disclosure.

Specifically, referring to FIG. 15, the first shielding wire 137a, the second shielding wire 137c, and the second electromagnetic shielding wire 138 may also be disposed at the same time.

In one embodiment, the first connecting wire 81, the second connecting wire 82, and the third connecting wire 83 may be disposed on a same layer. The first connecting wire 81, the second connecting wire 82, and the third connecting wire 83 may also be disposed on different layers. Only two to the first connecting wire 81, the second connecting wire 82, and the third connecting wire 83 may also be disposed on a same layer.

It should be noted that in another embodiment, only the first shielding wire 137a and the second electromagnetic shielding wire 138 may also be disposed at the same time. Only the second shielding wire 137c and the second electromagnetic shielding wire 138 may also be disposed at the same time.

In one embodiment, the first electromagnetic shielding wire and the second electromagnetic shielding wire 138 may be disposed on a same layer as the first metal layer.

In one embodiment, the first pixel electrode 141 is a main pixel electrode 14, and the second pixel electrode 142 is a secondary pixel electrode 14.

It should be noted that the secondary pixel electrode 14 is disposed along the outer boundary of the main pixel electrode 14. The vertical crosstalk between the data line 135b and the main pixel electrode 14 may be reduced. There is no need to dispose a metal shielding layer between the data line 135b and the main pixel electrode 14 to increase the pixel aperture ratio.

The beneficial effects of the present disclosure are that

The beneficial effects of the present disclosure are that by increasing the distance between the first pixel electrode 141 and the second pixel electrode 142, by disposing a first electromagnetic shielding wire at the spacing region 70 between the first pixel electrode 141 and the second pixel electrode 142, and by setting the voltage of the first electromagnetic shielding wire to be the same as the voltage of the common electrode 22 to reduce the effect of the electric field between the edge area of the first pixel electrode 141 and the common electrode 22, and the electric field between the edge area of the second pixel electrode 142 and the common electrode 22 on the liquid crystal at the spacing region 70. At this time, since there is no differential pressure at the spacing region 70, the liquid crystal at the spacing region 70 will not be tilted, and provide a binding effect on the liquid crystal at the spacing region 70, avoiding the liquid crystal at the spacing region 70 generating a large angle under the effect of the electric field, and avoiding forming the dark lines at the spacing region 70.

In the above embodiments, the description of each embodiment has its own emphasis. For a part that is not detailed in an embodiment, it may be referred to the related descriptions of other embodiments.

In the above, the present disclosure has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A liquid crystal display panel, comprising:
an array substrate, comprising a first substrate and a plurality of pixel units arrayed on the first substrate;
a color filter substrate disposed opposite to the array substrate, wherein the color filter substrate comprises a second substrate and a common electrode disposed on the second substrate and opposite to the pixel units;
a liquid crystal layer disposed between the array substrate and the color filter substrate;
wherein each of the pixel units comprises a thin film transistor layer and a pixel electrode disposed on the thin film transistor layer, wherein the pixel electrode comprises a first pixel electrode, a second pixel electrode, and a spacing region disposed between the first pixel electrode and the second pixel electrode, wherein the first pixel electrode is a main pixel electrode, and the second pixel electrode is a secondary pixel electrode;
wherein the thin film transistor layer comprises a first electromagnetic shielding wire, wherein an orthographic projection of the first electromagnetic shielding wire on the pixel electrode is located at the spacing region between the first pixel electrode and the second pixel electrode, and wherein a voltage input to the first electromagnetic shielding wire is the same as a voltage input to the common electrode;

wherein the second pixel electrode is disposed along an outer boundary of the first pixel electrode;

wherein a routing area is disposed between adjacent two of the pixel units, wherein an enclosed area is formed between the second pixel electrode and the routing area, and wherein the first pixel electrode is disposed in the enclosed area; and wherein the second pixel electrode comprises a main portion and an extending portion connected to the main portion, wherein the main portion and the first pixel electrode are disposed along a row direction of the pixel units, and wherein the extending portion and the first pixel electrode are disposed along a column direction of the pixel units;

wherein the first electromagnetic shielding wire comprises first shielding wires disposed along the column direction of the pixel units, and an orthographic projection of the first shielding wire on the pixel electrode is disposed between the first pixel electrode and the main portion; and wherein reinforcing wires are disposed along the row direction of the pixel unit on the first shielding wire;

wherein each of the first shielding wires extends along the row direction, and each of the reinforcing wires protrudes perpendicularly from the first shielding wire along a vertical direction perpendicular to the column direction and the row direction such that the first shielding wires extending along the row direction and arranged along the column direction with the reinforcing wires arranged the row direction and protruding along the vertical direction forms a three-dimensional shielding wire structure.

2. The liquid crystal display panel according to claim 1, wherein the first electromagnetic shielding wire comprises a second shielding wire disposed along the row direction of the pixel units, and an orthographic projection of the second shielding wire on the pixel electrode is disposed between the first pixel electrode and the extending portion.

3. The liquid crystal display panel according to claim 1, wherein the thin film transistor layer comprises a second electromagnetic shielding wire disposed along the row direction of the pixel units, wherein the second electromagnetic shielding wire is disposed along the outer boundary of the second pixel electrode, and wherein a voltage input to the second electromagnetic shielding wire is the same as a voltage input to the common electrode.

4. The liquid crystal display panel according to claim 1, wherein the thin film transistor layer comprises a first metal layer disposed on the first substrate, and the first electromagnetic shielding wire and the first metal layer are disposed on a same layer.

5. A liquid crystal display panel, comprising:
an array substrate, comprising a first substrate and a plurality of pixel units arrayed on the first substrate;
a color filter substrate disposed opposite to the array substrate, wherein the color filter substrate comprises a second substrate and a common electrode disposed on the second substrate and opposite to the pixel units;
a liquid crystal layer disposed between the array substrate and the color filter substrate;
wherein each of the pixel units comprises a thin film transistor layer and a pixel electrode disposed on the thin film transistor layer, and wherein the pixel electrode comprises a first pixel electrode, a second pixel electrode, and a spacing region disposed between the first pixel electrode and the second pixel electrode;

wherein the thin film transistor layer comprises a first electromagnetic shielding wire, wherein an orthographic projection of the first electromagnetic shielding wire on the pixel electrode is located at the spacing region between the first pixel electrode and the second pixel electrode, and wherein a voltage input to the first electromagnetic shielding wire is the same as a voltage input to the common electrode;

wherein the second pixel electrode is disposed along an outer boundary of the first pixel electrode;

wherein a routing area is disposed between adjacent two of the pixel units, wherein an enclosed area is formed between the second pixel electrode and the routing area, and wherein the first pixel electrode is disposed in the enclosed area;

wherein the second pixel electrode comprises a main portion and an extending portion connected to the main portion, wherein the main portion and the first pixel electrode are disposed along the row direction of the pixel units, and wherein the extending portion and the first pixel electrode are disposed along a column direction of the pixel units;

wherein the first electromagnetic shielding wire comprises first shielding wires disposed along the column direction of the pixel units, and an orthographic projection of the first shielding wire on the pixel electrode is disposed between the first pixel electrode and the main portion; and wherein reinforcing wires are disposed along the row direction of the pixel unit on the first shielding wire;

wherein each of the first shielding wires extends along the row direction, and each of the reinforcing wires protrudes perpendicularly from the first shielding wire along a vertical direction perpendicular to the column direction and the row direction such that the first shielding wires extending along the row direction and arranged along the column direction with the reinforcing wires arranged the row direction and protruding along the vertical direction forms a three-dimensional shielding wire structure.

6. The liquid crystal display panel according to claim 5, wherein the first electromagnetic shielding wire comprises a second shielding wire disposed along the row direction of the pixel units, and an orthographic projection of the second shielding wire on the pixel electrode is disposed between the first pixel electrode and the extending portion.

7. The liquid crystal display panel according to claim 5, wherein the thin film transistor layer comprises a second electromagnetic shielding wire disposed along the row direction of the pixel units, wherein the second electromagnetic shielding wire is disposed along the outer boundary of the second pixel electrode, and wherein a voltage input to the second electromagnetic shielding wire is the same as a voltage input to the common electrode.

8. The liquid crystal display panel according to claim 5, wherein the thin film transistor layer comprises a first metal layer disposed on the first substrate, and the first electromagnetic shielding wire and the first metal layer are disposed on a same layer.

\* \* \* \* \*